United States Patent
Bradley et al.

(10) Patent No.: US 7,415,580 B2
(45) Date of Patent: Aug. 19, 2008

(54) SYSTEM FOR DETERMINING THE POSITION OF AN ELEMENT IN MEMORY

(75) Inventors: David E. Bradley, Fort Collins, CO (US); Fred J. Gross, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 11/194,372

(22) Filed: Aug. 1, 2005

(65) Prior Publication Data

US 2007/0028058 A1 Feb. 1, 2007

(51) Int. Cl.
*G06F 12/00* (2006.01)
(52) U.S. Cl. .................. 711/154; 711/110; 711/156; 710/57; 710/310
(58) Field of Classification Search .................. 711/100, 711/154
See application file for complete search history.

(56) References Cited

U.S. PATENT DOCUMENTS 5,617,543 A 4/1997 Phillips
6,487,550 B1 11/2002 Cutter
6,738,869 B1 * 5/2004 Moran et al. ................. 711/145
6,745,314 B1 6/2004 Wichman

OTHER PUBLICATIONS

Erdem Hokenek, Robert K. Montoye, and Peter w. Cook, "Second-Generation RISC Floating Pont with Multiply-Add Fused", in IEEE Journal of Solid-State Circuits, vol. 25, No. 5, Oct. 1990, pp. 1207-1213.
Xuejun Liang and Jack Jean, "Memory Access Scheduling and Loop Pipelining", Department of Computer Science, Jackson State University and Department of Computer Science and Engineering, Wright State University.

* cited by examiner

*Primary Examiner*—Donald Sparks
*Assistant Examiner*—Hashem Farrokh

(57) ABSTRACT

A system for determining a position of an element in memory comprising a memory queue with a plurality of separate entries and propagate and generate logic in communication with the memory queue such that the propagate and generate logic is operable to inspect each the separate entry in the memory queue and to output one or more vectors indicating the position of the element in the memory queue.

17 Claims, 5 Drawing Sheets

US 7,415,580 B2

SYSTEM FOR DETERMINING THE POSITION OF AN ELEMENT IN MEMORY

BACKGROUND OF THE INVENTION

Microprocessors often include circular buffers, which are a type of memory queue that may be used to store, e.g., memory accesses or instructions. The function of finding the first element of a certain type in the circular buffer may currently be implemented through ripple logic. Ripple logic starts at the first entry in the circular queue and determines if the entry is the desired element. If the entry is not the desired element, the circuitry sends a signal down to the next entry in the circular queue to indicate that the element has not been found. Circuitry associated with the next entry would then check that entry for the element. The process is repeated through each of the entries until the circuitry finds the desired value.

In current ripple designs, the gate delay through the circuit is directly proportional to the queue modulo (i.e., the size of the queue). Thus, a 64-entry queue would require twice the gate delay as a 32-entry queue. Such linearly increasing gate delay may be a disadvantage for processors with larger queues.

DETAILED DESCRIPTION OF THE INVENTION

Figure 1:
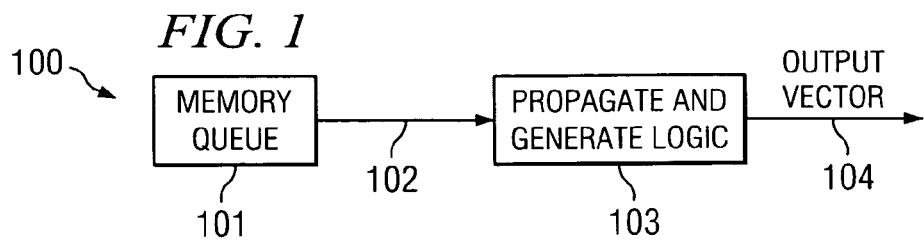
FIG. 1 is an illustration of an exemplary system, adapted according to one or more embodiments of the present invention for determining a position of an element in memory.

FIG. 1 is an illustration of exemplary system 100, adapted according to one or more embodiments of the present invention, for determining a position of an element in memory. System 100 includes memory queue 101, propagate and generate logic 103 with input 102 from memory queue 101, and output vector 104. In system 100, propagation and generation logic 103 inspects the contents of memory queue 101 through its inputs 102. Propagate and generate logic 103 then generates output vector 104, which indicates the position of a particular element in memory queue 101.

In an exemplary embodiment, memory queue 101 is a circular buffer, which is a particular kind of out-of-order queue that uses a start pointer to define a location in the queue as a first location. When the physical end of the queue is reached, the address scheme "wraps" around the other end and continues back to the element preceding the starting address. Thus, while each location in the queue has an absolute address, each location may also have a circular address that differs from the absolute address. An example of a circular buffer is an issue queue that determines which instruction in the queue should be executed in the pipeline next. Another example of a circular queue is a queue of outstanding memory accesses to fetch items from a Level 2 (L2) data cache. In such a case, system 100 would operate to find the first entry in queue 101 to access the L2 cache to fetch an item therein.

The following examples describe embodiments wherein memory queue 101 is a 32-entry circular buffer used for L2 memory accesses. However, it should be noted that the various embodiments are not limited to 32-bit circular buffers or buffers for memory accesses. For example, various embodiments may be adapted for use in buffers of 64 or 128 entries, and the buffers may be other types of out-of-order buffers, such as an out-of-order interrupt queue. Further, the buffer may be used for other functions, such as, for example, issuing instructions to a pipeline.

Figure 2:
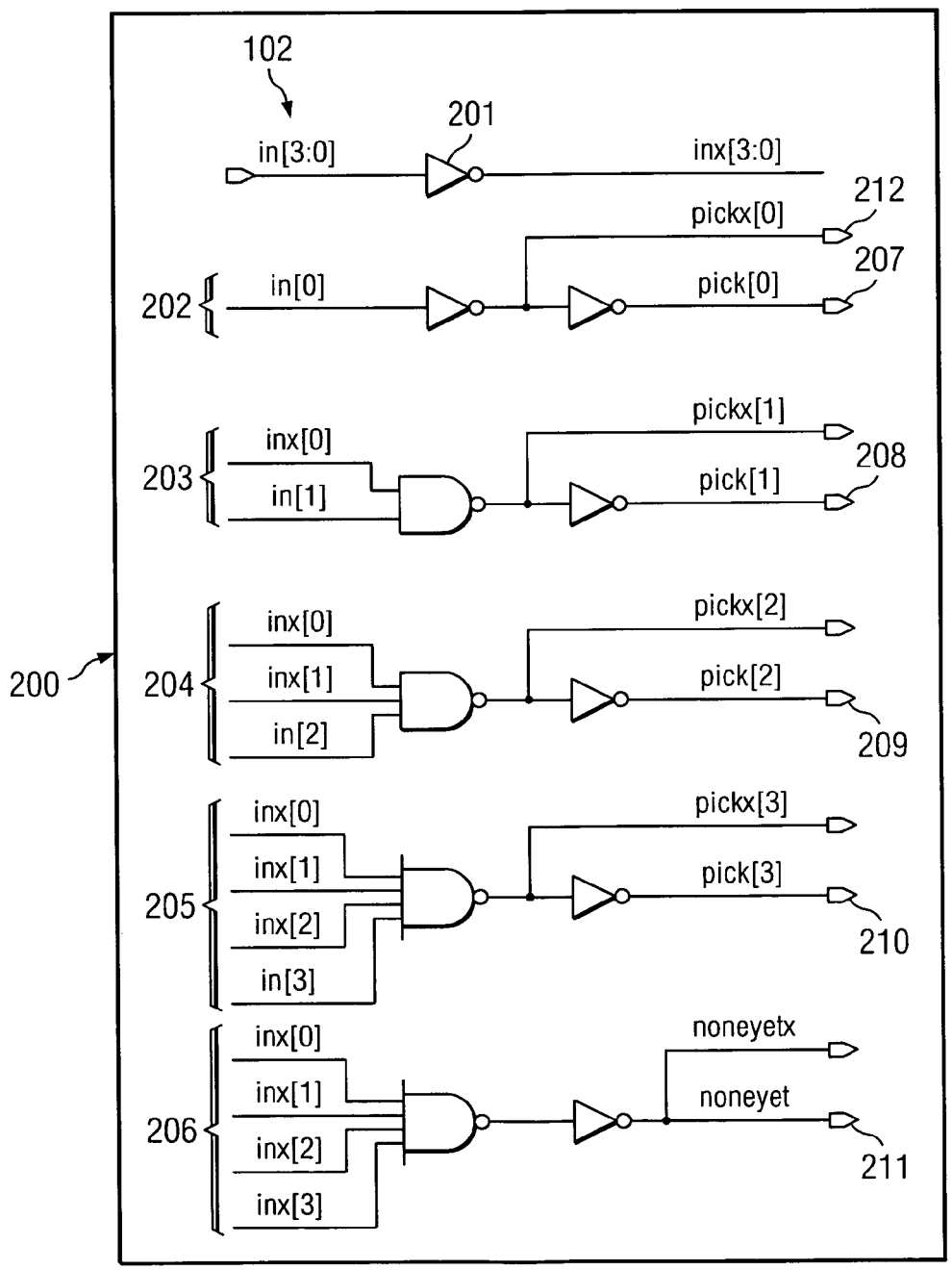
FIG. 2 is an illustration of exemplary circuitry, adapted for use in one or more embodiments of the system of FIG. 1, wherein the memory queue is a 32-entry memory queue.
Figure 3:
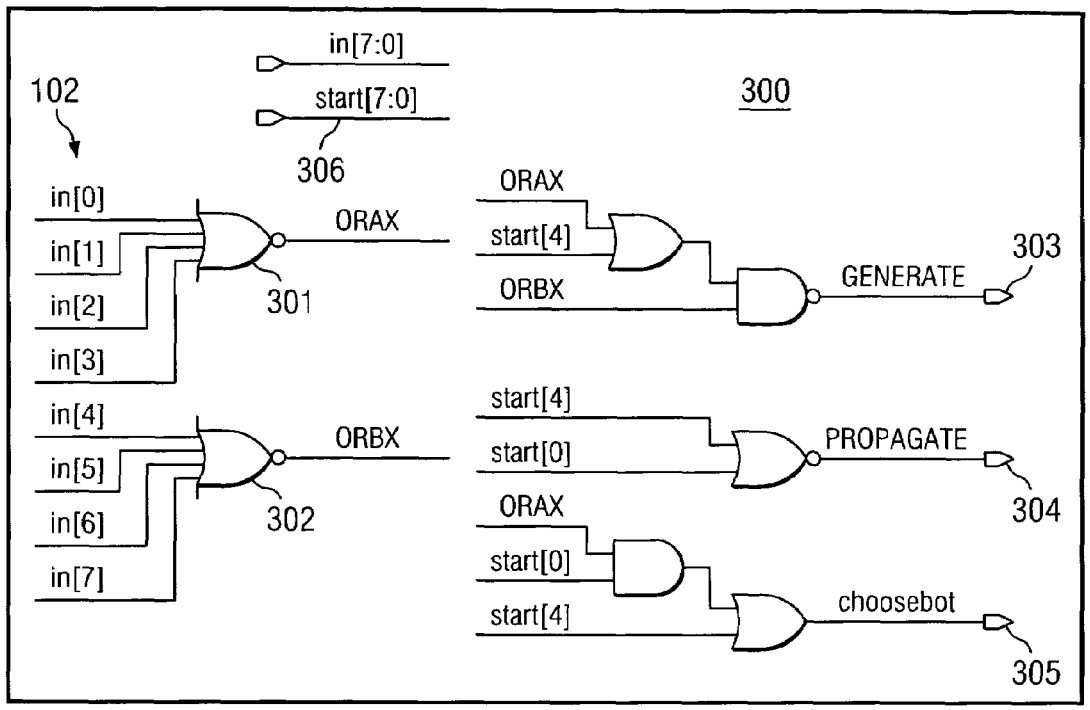
FIG. 3 is an illustration of exemplary circuitry, adapted for use in one or more embodiments of the system of FIG. 1, wherein the memory queue is a 32-entry memory queue.
Figure 4:
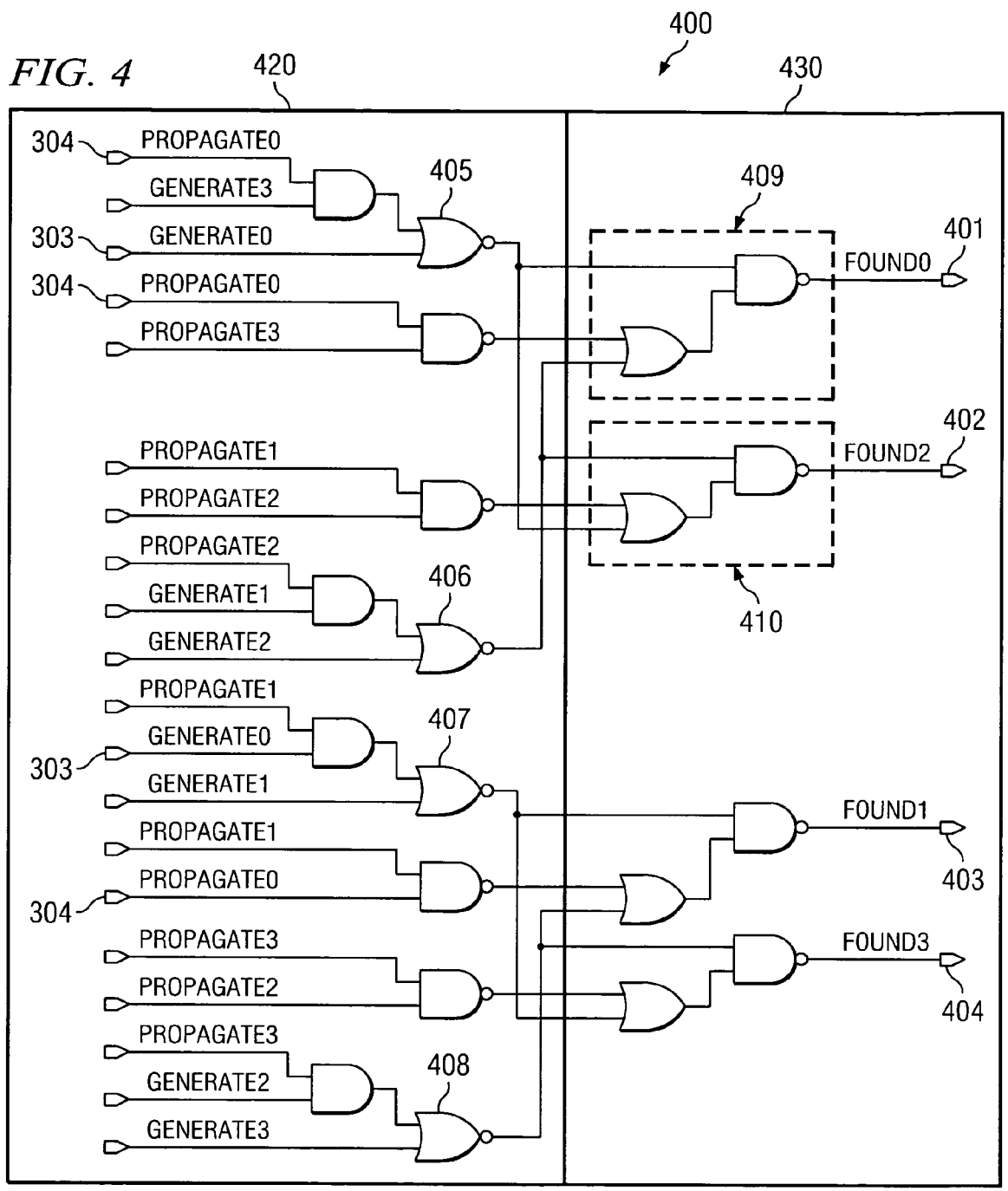
FIG. 4 is an illustration of exemplary circuitry, adapted for use in one or more embodiments of the system of FIG. 1, wherein the memory queue is a 32-entry memory queue.
Figure 5:
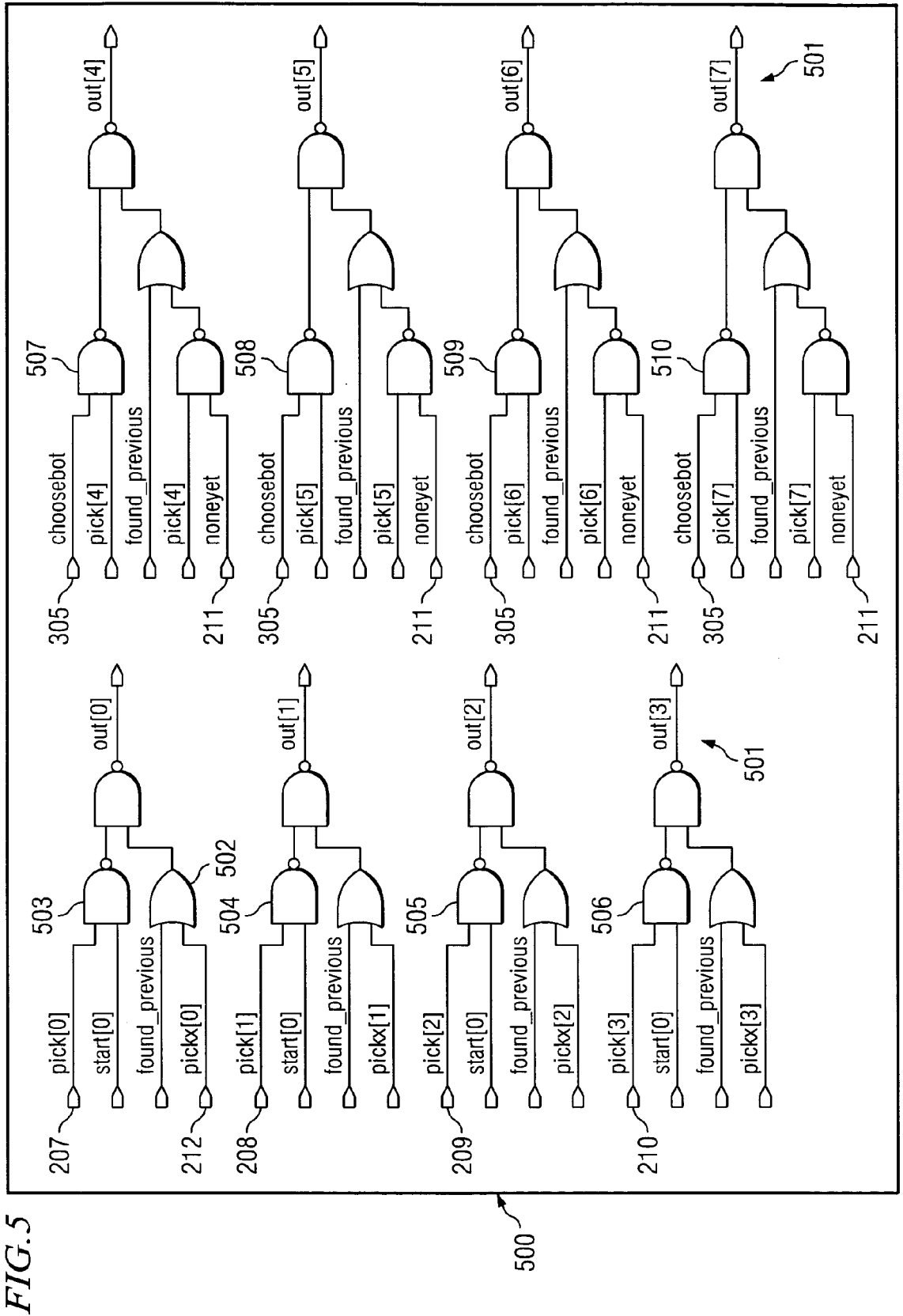
FIG. 5 is an illustration of exemplary circuitry, adapted for use in one or more embodiments of the system of FIG. 1, wherein the memory queue is a 32-entry memory queue.

FIGS. 2-6 illustrate exemplary functional units included in one or more embodiments of propagate and generate logic 103. Specifically, FIG. 2 is an illustration of exemplary circuitry 200 adapted for use in one or more embodiments of system 100 (FIG. 1), wherein memory queue 101 is a 32-entry memory queue. Circuitry 200 inspects a group of four entries and determines, in that group of four entries, which entry is the first entry of interest. For example, when the first valid memory access entry in the queue is indicated by the first binary one after the start pointer, circuitry 200 determines which entry in that group of four contains the first one. Because this example uses a 32-entry memory queue, the first one in any particular group of four entries is not conclusive as to the issue of the location of the first entry in the queue. In fact, because the memory queue in this example is a circular buffer, the logic described below with regard to FIGS. 3-5 is also employed in order to determine, conclusively, the location of the first one in the queue. Further, circuitry 200 inspects the first four entries in the memory queue, such that seven other sets of circuitry (not shown) similar to circuitry 200 are used to inspect the fifth through thirty-second entries in the queue. For purposes of this discussion, it should be assumed that circuitry 200 is replicated down the queue such that all entries in the queue are inspected. While four entries are shown in input 102, other embodiments may include other numbers of entries.

In FIG. 2, in[3:0] is an input vector including the first four entries of the memory queue; inx[3:0] is a vector including the inverse of the first four entries of the memory queue. Pick is a vector indicating the position of the first element of interest in the memory queue, as explained below, and pickx is its inverse. Similarly, noneyet and noneyetx have a signal and inverse signal relationship, and the function of noneyet is explained more fully below. Inverter 201 is used to generate dual rail inputs, such that circuitry 201-206 has access to both an input vector and a complement of that input vector. Circuitry 200 fires (propagates a one onto) the pick vector made of signals 207-210. An inverse pick vector, including signal 212, is also output. When one or more of the four entries in the queue includes a one, the pick vector outputs a one that indicates which of the first four entries is the first one to contain a one. For example, if entry zero contains a one, circuitry 200 fires pick[0] 207, and each of the subsequent signals 208-210 outputs a zero. Causing subsequent signals to output a zero when a previous signal indicates a first value of interest is referred to herein as "masking off" the entries in the queue, such that when circuitry 200 fires pick[0] 207 to indicate a one, pick entries 208-210 are forced to zero, thereby masking off in[1]-[3] down the queue.

If in[0] (the first entry in the queue) was actually a zero, and if in[1] were a one, circuitry 200 would propagate pick[1] 208 and further mask off signals 209-210 that correspond to the third and fourth entries in the queue. Circuitry 200 is similar to a ripple byte design, wherein the calculations are done in parallel.

It can be seen that there are five acceptable logical conditions for the pick vector—four conditions wherein one and only one of signals 207-201 is a one and one condition wherein all of signals 207-210 are zeros. The condition wherein the pick vector is all zeros indicates that there was no one in the four entries. Noneyet (pronounced "none yet") vector 211 indicates if any of the entries in that particular group are ones. Vector 211 is a one when none of the entries in the group are ones. In short, circuitry 200 "looks" over a group of four entries in a memory access queue and determines which one of those four entries is the first valid element in that particular group of four.

Converting the above description into Boolean logic, it is clear that:

pick[0] 207=in[0]
pick[1] 208=(NOT in[0]) AND in[1]
pick[2] 209=(NOT in[0]) AND (NOT in[1]) AND in[2]
pick[3] 210=(NOT in[0]) AND (NOT in[1]) AND (NOT in[2]) AND in[3]
Noneyet 211=(NOT in[0]) AND (NOT in[1]) AND (NOT in[2]) AND (NOT in[3]).

FIG. 3 is an illustration of exemplary circuitry 300 adapted for use in one or more embodiments of system 100 (FIG. 1), wherein memory queue 101 is a 32-entry memory queue. Note that circuitry 300 receives eight entries. Accordingly, when system 100 includes a 32-entry memory queue, circuitry 300 may be replicated three additional times down the queue. Circuitry 300 receives two adjacent four-bit chunks, whereas circuitry 200 (FIG. 2) receives one four-bit chunk. In other words, in FIG. 3, input 102 provides the first eight entries of the memory queue to circuitry 300 (i.e., circuitry 300 receives a zero to seven vector).

NOR gates 301 and 302 process the entries to determine if any of the eight entries is a one. Each NOR gate 301 and 302 processes its respective four-bit chunk. In short, gates 301 and 302 break the eight entries into two groups of four and determine whether each group of four includes a one. Circuitry 300 outputs a one on generate[0] 303 when there is an appropriate one in that particular group of eight entries. It signals to downstream components (not shown) that a one has been found and that certain outputs should be zeroed out. This is explained in more detail with regard to FIG. 3. A one is output on propagate[0] 304 other than when the group of eight entries is at the head of the vector, which prevents an endless loop around the circular buffer.

Propagate 304 and generate 303 depend on start vector 306. It should be noted that start vector 306 includes the first eight entries of the complete start vector. Corresponding portions of the complete start vector are used as circuitry 300 is replicated down the queue. Start vector 306 indicates which entry in the queue is the first in the circular addressing scheme. It is a pointer to define the starting point of the buffer. This particular example includes a simplifying assumption that the complete start vector points only to entries on four-bit boundaries. In other words, it may point to one of entries zero, four, eight, etc. The embodiments are not limited to this simplifying assumption. In fact, some embodiments may be adapted to include a start vector that can point to any entry, alternating entries, every eighth entry, etc. The complete start vector is a 32-bit vector with a single one in it that indicates the start of the memory queue. Start vector 306, which is a portion of the complete start vector, may or may not include the one. Circuitry 300 only looks at start[0] and start[4] because they are the only two of the eight discrete points in the group to which the complete start vector may point.

There are three cases that may occur with regard to circuitry 300, two of which result in generate 303 being fired. First, for a chunk of four entries, if the start point is outside of the chunk of four entries, then any one in the chunk of four entries causes all downstream entries to zero out their ultimate output vectors (output vectors are discussed with regard to FIG. 5), by outputting a one on generate 303. This zeroing-out is accomplished by propagation into the logic depicted in FIG. 4. Thus, if there is a one in either the top or the bottom chunk of four when start[0] and start[4] are both zero, then circuitry 300 outputs a one on generate 303.

The second case occurs when start vector 306 points in the middle of this group of eight entries (i.e., start[4] is a one). In every other situation the top chunk of four entries in this group of eight entries precedes the bottom chunk of four entries in the circular addressing scheme. However, if start vector 306 points in the middle of the group of eight, then the bottom chunk of four is the first chunk of four entries in the circular track, and the top chunk is the last chunk in the circular track.

Propagation and generation logic 104 (FIG. 1) includes logic to zero out the effects of the pick vector in the case when start vector 306 points to the bottom chunk in the group of eight because the ones in the top half of the eight bit vector should not force downstream bits to act as though a one has been found in a preceding circular entry if no such one has been found. An interesting case is when in[4] through in[7] are zeros and start[4] is one. Then, if in[8] (not shown) is a one, the pick vector should appropriately point to in[8] because it is the first one in the 32 bit circular vector. However, in order to do that, propagation and generation logic 104 should mask off any ones occurring in[0]-[3]. Thus, once circuitry 300 finds a one in the queue, it fires generate 303, which is output to downstream logic gates (not shown) that force the effects of the pick vector of some entries to zero.

Circuitry 300 also includes choosebot signal 305. In a general sense, choosebot signal 305 indicates that the bottom four bits of the eight bit group is either the first chunk in the queue, or that the proceeding four bit chunk did not contain a one. Choosebot 305 is explained in more detail with regard to FIG. 5.

To briefly explain the logic of circuitry 300, the following description is given:

Generate 303 is a one if and only if:
  ((start 306 does NOT point to the second chunk of four)
    AND
  (at least one of in[0]-[7] is a one))
  OR
  ((start does point to the second chunk of four) AND
  (at least one of in[4]-[7] is a one)).
Propagate 304 is a one if and only if:
  (start does NOT point to the first chunk of four) AND
  (start does NOT point to the second group of four).
Choosebot 305 is a one if and only if:
  (start points to the second chunk of four) OR
  ((start points to the first chunk of four) AND
  (in[0]-[3] are all zeroes)).

FIG. 4 is an illustration of exemplary circuitry 400 adapted for use in one or more embodiments of system 100 (FIG. 1), wherein memory queue 101 is a 32-entry memory queue. It should be noted that while circuitry 200 and circuitry 300 (FIGS. 2 and 3, respectively) are replicated in a 32-entry memory queue, circuitry 400 is not replicated for use with a 32-bit queue. It should also be noted that, in this example, the inputs to circuitry 400 are received from circuitry 300 and from circuitry similar to circuitry that is replicated on other portions of the memory queue and that each eight-bit group produces a propagate and generate signal. Such propagate signals are indicated in FIG. 4 as propagate 0, propagate 1 and propagate 3, and the same applies to the generate signals.

Circuitry 400 generates signals 401-404 that indicate whether a one has been found in the queue in a corresponding eight bit segment. Found signals 401-404 are used in the logic of FIG. 5 to indicate that a one has been found in a particular preceding eight-bit group in the queue, thereby causing logic to zero out outputs that correspond to entries later in the circular queue. In short, the propagate and generate signals are combined in such a way to generate found signals 401-404, that are used in the logic of FIG. 5, as will be explained below.

In the case of a 32-bit memory queue, circuitry 400, as shown, is optimized to include a smaller number of gates than might be expected. For example, the outputs of gates 405 and 406 feed both the calculation for found[0] 401 and found[2] 402. Also, the outputs of gates 407 and 408 feed the calculations for found[2] 403 and found[3]. This is in contrast to other propagate and generate schemes that may include, for example, a separate logic gate driving each input of the last gates for calculating found signals 401-404, such that there would be three gates driving each input into complex OR/AND/INVERT gate 409 and another three inputs driving gates 410.

Circuitry 400 performs its calculations in the illustrated parallel fashion through two logic stages 420 and 430. To get from a propagate signal to a found signal, in this example, is a two gate delay. In a ripple design, if the first one is in the first chunk of four entries, there would generally be seven gate delays before that information was made available in the last chunk of four entries in the queue. Fewer gate delays may be an advantage in embodiments wherein it is desirable to minimize calculation time.

As illustrated in FIG. 4, it is clear that:
Found[0] 401 is a one if and only if there is a one in the input vector between the start pointer and in[7], inclusive.
Found[1] 402 is a one if and only if there is a one in the input vector between the start pointer and in[15], inclusive.
Found[2] 403 is a one if and only if there is a one in the input vector between the start pointer and in[23], inclusive.
Found[3] 404 is a one if and only if there is a one in the input vector between the start pointer and in[31], inclusive.
Logically, it can be shown that:
Found[0] 401=gen0 OR (gen3 AND prop0) OR (gen2 AND prop3 AND prop0) OR (gen1 AND prop2 AND prop3 AND prop0)
Found[1] 402=gen1 OR (gen0 AND prop1) OR (gen3 AND prop0 AND prop1) OR (gen2 AND prop3 AND prop0 AND prop1)
Found[2] 403=gen2 OR (gen1 AND prop2) OR (gen0 AND prop1 AND prop2) OR (gen3 AND prop0 AND prop1 AND prop2)
Found[3] 404=gen3 OR (gen2 AND prop3) OR (gen1 AND prop2 AND prop3) OR (gen0 AND prop1 AND prop2 AND prop3)

The reduction of the number of logic gates in circuitry 400 that allows, for example, gates 405 and 406 to feed the calculations of found[0] 401 and found[2] 403 (described above) may be further described as follows by rearranging the formulas for found[0] 401 and found[2] 403:

Found[0] 401=(gen0 OR (gen3 AND prop0)) OR (prop3 AND prop0 AND (gen2 OR (gen1 AND prop2))

Found[2] 403=(gen2 OR (gen1 AND prop2)) OR (prop1 AND prop2 AND (gen0 OR (gen3 AND prop0))

It should be noted that the (gen0 OR (gen3 AND prop0)) term appears in both the found[0] and found[2] equations. Likewise, the (gen2 OR (gen1 AND prop2)) term also appears in both equations. This allows circuitry 400 use the same two AND/OR/INVERT gates to feed both the last gate in the found[0] 401 and found[2] 403 calculation. A similar calculation can be made for found[1] 402 and found[3] 404.

FIG. 5 is an illustration of exemplary circuitry 500 adapted for use in one or more embodiments of system 100 (FIG. 1), wherein memory queue 101 is a 32-entry memory queue. Circuitry 500 includes output signals 501 that indicate the particular location in the memory queue of the first one. Circuitry 500 corresponds to in[0]-[7] entries in the memory queue. Therefore, in this example, circuitry 500 is replicated three more times to fit a 32-bit memory queue. Therefore, output signals 501 represent a fourth of the complete output vector.

Output signals 501 are similar to the pick signals of FIG. 2 in that they indicate a position of a first found one. Pick signals, however, only indicate the location of a first one within a single group of four entries, whereas the complete output vector indicates the true first one in the circular memory queue. In a general sense, circuitry 500 receives the found vector from FIG. 4, pick signals from FIG. 2, and start and choosebot signals from FIG. 3. Circuitry 500 processes the input signals to generate output signals 501. In this example, if there are one or more ones in the queue, the complete output vector generates a single one in the output that corresponds to the first valid entry. If there are no ones in the memory queue, then the complete output vector is all zeroes.

The right half of circuitry 500 is associated with the top four bits in the first eight-bit group, and the right half of circuitry 500 is associated with the bottom four bits in that eight-bit group. The found_previous input is the same as the found outputs of FIG. 4. Because of the looping structure of the propagation and generation circuitry 103 (FIG. 1), the found[0] output goes into the second group of eight entries, the found[1] output goes into the third group, the found[2] output goes into the fourth group, and the found[3] three output loops back to the first group of eight entries. Accordingly, the found_previous inputs of circuitry 500 are the found[3] output from FIG. 4. Other replicated instances of circuitry 500 in propagation and generation circuitry 103 down the queue receive their appropriate found output.

As a general rule, whether in circuitry 500 or one of its replications, the found_previous signal indicates that there is a one earlier in the queue, thereby causing the circuitry to zero out its output signals. Note in circuitry 500 that the found_previous signal forces outputs 501 low if it is a one. For example, whenever found_previous is a one, it forces, for example, OR gate 502 to evaluate to a one.

With regard to the logic on the left side of FIG. 5, there are two cases when an output signal is high. The first case arises when the start vector points to the first chunk of four entries (i.e., in FIG. 5, in[0]-[3], not shown). In such a case, because of the position of the start vector, if there is a one in the first chunk of four entries, that one must be the first one in the circular queue. Accordingly, the appropriate one of out[0]-[4] should be forced to a one. NAND gates 503-506 take into account the start vector and pick outputs. Therefore, when the start vector points to that particular chunk of four entries, and one of those pick signals is a one, then the logic propagates the one to the appropriate output 501. The second case that forces output signal 501 to one is when found_previous is a zero, which means that there is no earlier one in the memory queue, and when a pick signal in that particular group of four is a one.

With regard to the logic on the right side of FIG. 5, the inputs to NAND gates 507-510 are similar to the inputs to gates 503-506, except the inputs to gates 507-510 include a choosebot signal rather than a start signal. Once again, the choosebot signal indicates that 1) either the start vector points to the first chunk of four in that group of eight entries (i.e., the entries that correspond to the logic on the left side), and none of those four bits contains a one, or 2) the start vector points to the second chunk of four entries in that group of eight. In either of those cases, if there is a one in the second chunk of four entries, then the circuitry should output a one onto the appropriate output signal that corresponds to the position of the one in the queue.

A second case that causes a one to be output by the logic on the right side of FIG. 5 depends on the noneyet signal from FIG. 2. The noneyet signal is a one when none of the first four entries in a group of eight entries includes a one. There are also pick[4]-[7] that indicate a first one, if any, in that four-bit chunk. When the noneyet signal is true and there is a first one in the second chunk of four entries, and when no other previous one is found, then the appropriate one is propagated to an output.

Note that the delay from found_previous to output is a single gate delay in FIG. 5. From the input in FIG. 2, to the generate and propagate terms, there are two more gate delays. There are two more gate delays from the generate and propagate signals to the found signals in FIG. 4. Thus, in the embodiment illustrated in FIGS. 2-5, the calculation is solved in five gate delays. In this embodiment, the load gate count scales logarithmically with the size of the queue. In other words, if the queue is increased to sixty-four entries, the number of delays would not double, as in a linear relationship, but rather, would increase less drastically in a logarithmic fashion. Systems that provide such a logarithmic increase may provide an advantage over systems that have a linear increase (e.g., ripple designs) by allowing the use of longer queues.

The following examples provide a brief illustration of the operation of system 100 (FIG. 1) when the memory queue is a 32-bit circular buffer, and propagation and generation logic 103 is implemented with the circuitry of FIGS. 2-5.

EXAMPLE 1

In this example, the start pointer points to in[0], and the first one occurs at in[17]. See Table 1.

TABLE 1

|  | 0123 | 4567 | 11 8901 | 1111 2345 | 1111 6789 | 2222 0123 | 2222 4567 | 2233 8901 |
|---|---|---|---|---|---|---|---|---|
| Start | 1 | 0 | 0 | 0 | 0 | 0 | 0 | 0 |
| In | 0000 | 0000 | 0000 | 0000 | 0110 | 0010 | 1010 | 0010 |
| Pick | 0000 | 0000 | 0000 | 0000 | 0100 | 0010 | 1000 | 0010 |
| Noneyet | 1 | X | 1 | X | 0 | X | 0 | X |
| Generate | 0 |  | 0 |  | 1 |  | 1 |  |
| Propagate | 0 |  | 1 |  | 1 |  | 1 |  |
| Choosebot | 1 |  | 0 |  | 0 |  | 0 |  |

TABLE 1-continued

| Found {0123} | 0 |  | 0 |  | 1 |  | 1 |  |
|---|---|---|---|---|---|---|---|---|
| Found {3012} | 1 |  | 0 |  | 0 |  | 1 |  |
| out | 0000 | 0000 | 0000 | 0000 | 0100 | 0000 | 0000 | 0000 |

As shown, the output vector indicates that the first one is at in[17].

EXAMPLE 2

In this example, the start pointer points to in[16], and the first one occurs at in[17]. See Table 2.

TABLE 2

|  | 0123 | 4567 | 11 8901 | 1111 2345 | 1111 6789 | 2222 0123 | 2222 4567 | 2233 8901 |
|---|---|---|---|---|---|---|---|---|
| Start | 0 | 0 | 0 | 1 | 0 | 0 | 0 | 0 |
| In | 0000 | 0000 | 0000 | 0000 | 0110 | 0010 | 1010 | 0010 |
| Pick | 0000 | 0000 | 0000 | 0000 | 0100 | 0010 | 1000 | 0010 |
| Noneyet | 1 | X | 1 | X | 0 | X | 0 | X |
| Generate | 0 |  | 0 |  | 1 |  | 1 |  |
| Propagate | 1 |  | 1 |  | 0 |  | 1 |  |
| Choosebot | 0 |  | 0 |  | 0 |  | 0 |  |
| Found {0123} | 1 |  | 1 |  | 1 |  | 1 |  |
| Found {3012} | 1 |  | 1 |  | 1 |  | 1 |  |
| out | 0000 | 0000 | 0000 | 0000 | 0100 | 0000 | 0000 | 0000 |

As shown, the found[1] output from FIG. 3 does not adequately answer the question "Is there a '1' earlier in the circular queue than in[16]?" in the case that start points to in[16]. In that case, the circuitry of FIG. 4 (actually, a replication thereof farther down the queue) processes the found[1] signal with the start[16] signal to determine the correct first one.

EXAMPLE 3

In this example, the start pointer points to in[20], and the first one occurs at in[22]. See table 3.

TABLE 3

|  | 0123 | 4567 | 11 8901 | 1111 2345 | 1111 6789 | 2222 0123 | 2222 4567 | 2233 8901 |
|---|---|---|---|---|---|---|---|---|
| Start | 0 | 0 | 0 | 0 | 0 | 1 | 0 | 0 |
| In | 0000 | 0000 | 0000 | 0000 | 0110 | 0010 | 1010 | 0010 |
| Pick | 0000 | 0000 | 0000 | 0000 | 0100 | 0010 | 1000 | 0010 |
| Noneyet | 1 | X | 1 | X | 0 | X | 0 | X |
| Generate | 0 |  | 0 |  | 1 |  | 1 |  |
| Propagate | 1 |  | 1 |  | 0 |  | 1 |  |
| Choosebot | 0 |  | 0 |  | 1 |  | 0 |  |
| Found {0123} | 1 |  | 1 |  | 1 |  | 1 |  |
| Found {3012} | 1 |  | 1 |  | 1 |  | 1 |  |
| out | 0000 | 0000 | 0000 | 0000 | 0000 | 0010 | 0000 | 0000 |

This example indicates an inadequacy of the found[1] signal, by itself in determining that a one has been detected earlier in the queue than in[16]-[23]. Because of the position of the start pointer, it is true that there is a one earlier in the circular queue than in[16], but it is not true that there is a one earlier in the queue than in[20]-[23]. Thus, the system uses the choosebot signal to propagate pick[20]-[23] into out[20]-[23].

Figure 6:
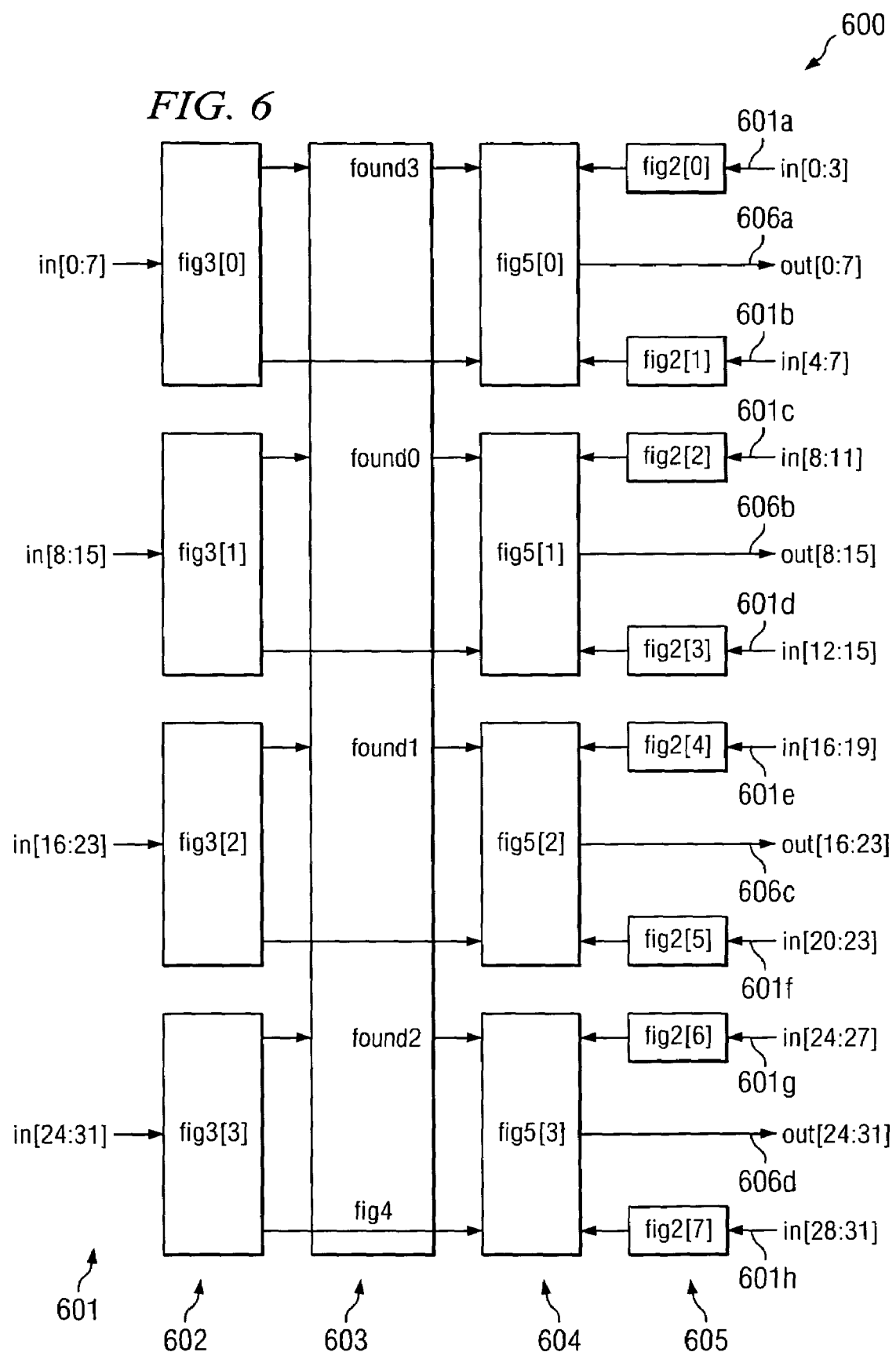
FIG. 6 is an illustration of exemplary propagation and generation logic adapted for use in one or more embodiments of the system of FIG. 1, wherein the memory queue is a 32-entry memory queue.

FIG. 6 is an illustration of exemplary propagation and generation logic 103 (FIG. 1) adapted for use in one or more embodiments of system 100, wherein memory queue 101 is a 32-entry memory queue. FIG. 6 illustrates one possible relationship among inputs 601, outputs 606, and the logic of FIGS. 2-5. As shown, inputs 601 lead into logic 602 and 605. Logic 602 is replicated four times, and logic 605 is replicated eight times. Logic 602 outputs a propagate and generate vector to logic 603 so that logic 603 produces the found vector. Logic 604 receives a pick vector and a noneyet vector from logic 605, a choosebot vector from logic 602, a found vector from logic 603, and the start vector. Logic 604 processes those signals to generate output vector 606 that indicates the location of the first one in the memory queue, as described above with regard to FIG. 5.

Figure 7:
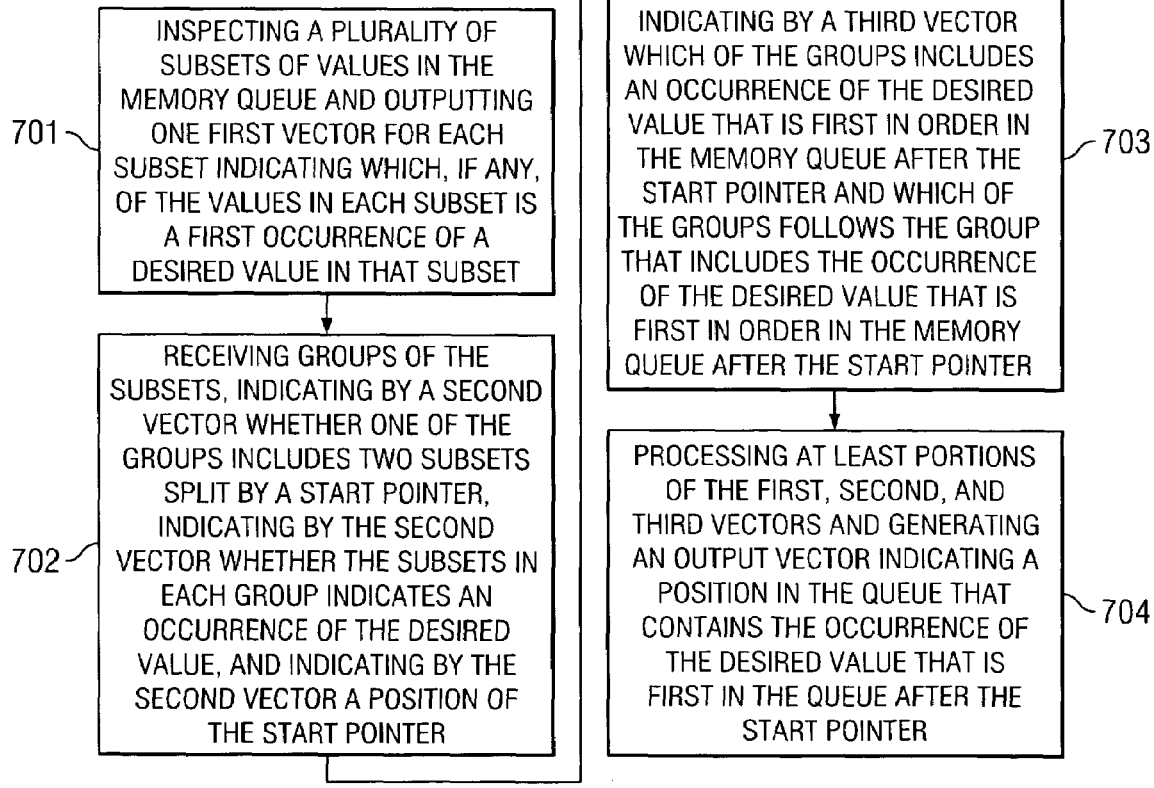
FIG. 7 is a flowchart illustrating an exemplary method for finding an occurrence of a desired value in a memory queue, according to one or more embodiments of the present invention.

FIG. 7 is a flowchart illustrating exemplary method 700 for finding an occurrence of a desired value in a memory queue, according to one or more embodiments of the present invention. In step 701, circuitry 200 (FIG. 2) and other similar replications inspect a plurality of subsets of values in the memory queue and output a first vector for each subset indicating which, if any, of the values in each subset is a first occurrence of a desired value in that subset. In FIG. 2, the subsets are groups of four entries from the queue. The first vector may include, but is not limited to, pick signals and noneyet signals, as described above.

In step 702, circuitry 300 (FIG. 3) receives a groups of said subsets, indicates by a second vector whether one of the groups includes two subsets split by a start pointer, indicates by the second vector whether the subsets in each said group indicates an occurrence of the desired value, and indicates by the second vector a position of the start pointer. In FIG. 3, the groups of subsets are eight-bit groups that include two four-bit chunks. In some cases, the start pointer may point to the second four-bit chunk in the group, such that the first four-bit chunk in the group is the last four-bit chunk in the circular queue. The second vector may include, among other things, propagate and generate signals, a start signal, and a choosebot signal.

In step 703, circuitry 400 (FIG. 4) processes at least a portion of said second vector and indicates by a third vector which of the groups includes an occurrence of the desired value that is first in order in the memory queue after the start pointer and which of the groups follows the group that includes the occurrence of the desired value that is first in order in the memory queue after the start pointer. In FIG. 4, circuitry 400 receives the propagate and generate signals from circuitry 300 and outputs the found vector. The found vector indicates if one of the eight-bit groups from step 702 includes an occurrence of a one that is first in the circular order of the queue. The found vector also indicates which, if any, of the eight-bit groups follow that particular eight-bit group. Therefore, when a first one is found in an eight-bit group, a found signal corresponding to that group outputs a one, and the found signals for the groups following that group in the circular order also output a one. In this way, the found vector indicates a possible location of the first occurrence by narrowing the locations down to eight entries.

In step 704, The logic of FIG. 5 processes at least portions of the first, second, and third vectors and generates an output vector indicating a position in the queue that contains the occurrence of the desired value that is first in the queue after the start pointer. In FIG. 5, circuitry 500 receives pick, start, found, choosebot, and noneyet signals generated in previous steps, processes those signals, and generates an output vector that indicates the location in the queue of the first one. For instance, in the circular addressing scheme, if the first one is at entry seventeen, the output vector will be zeroes, except for a one at entry seventeen. If there is no one in the memory queue, the output vector is zeroed out.

Although FIG. 7 depicts a particular order for carrying out steps 701-704, it should be noted that other embodiments are possible wherein one or more steps are in a different order, more steps are added, or steps are consolidated because the steps are conceptual divisions that are chosen for convenience and clarity of explanation. For instance, steps 701 and 704 may be conceptually combined into single step. Further, while the logic of FIGS. 2-5 may be used to carry out the function of FIG. 7, other structures or mechanisms may be used that are within the scope of embodiments. For instance, other arrangements of gates based on different manipulations of Boolean algebra may provide propagate and generate logic for carrying out method 700. Further, the term, "vector," as used herein may refer to one or more sets of signals.

The functions described herein may be performed in hardware or software. For example, method 700 may be performed by one or more components of a microprocessor, Application Specific Integrated Circuit (ASIC), or other device for performing logic operations. Further, the logic depicted in FIGS. 2-6 may be formed on a microprocessor, ASIC, or other device. Similarly, the functions may be performed by a computer system executing instructional code in the form of software, firmware, or a combination thereof. For example, the logic of FIGS. 2-6 may be implemented in instructional code instead of hardware logic gates. Such implementations are within the scope of embodiments.

What is claimed is:

1. A system for determining a position of an element in memory comprising:
   a circular memory queue with a plurality of separate entries; and
   propagate and generate logic in communication with said circular memory queue such that said propagate and generate logic is operable to inspect each said separate entry in said circular memory queue and to output one or more vectors indicating said position of said element in said circular memory queue, wherein said propagate and generate logic includes:
   a first stage for outputting a vector indicating one or more occurrences of said element in said entries of said memory queue;
   a second stage for outputting propagate and generate signals;
   a third stage for receiving said propagate and generate signals and outputting a vector indicating a possible first location of said element in said queue;
   a fourth stage for receiving said vectors output by said first and third stages, said fourth stage operable to output the first location of said element in said queue.

2. The system of claim 1 wherein said circular memory queue is an out of order queue.

3. The system of claim 1 wherein said system is operable to indicate a first valid element in said circular memory queue for issuing to a pipeline.

4. The system of claim 1 wherein said system is operable to indicate a first memory access to be sent to a Level two (L2) cache.

5. The system of claim 1 wherein said propagate and generate logic includes a first stage ripple.

6. The system of claim 1 wherein said circular memory queue is thirty-two bits in length, and wherein said third stage reuses one or more logic gates to optimize a total number of gates in said third stage.

7. The system of claim 1 wherein said propagate and generate logic is implemented in circuit logic gates in a microprocessor.

8. A method for finding an element in a memory queue, said method comprising:
   inspecting contents of said memory queue for one or more occurrences of an element therein; and
   based on said inspecting, using propagate and generate logic to output a first vector indicating a position of said element in said queue wherein said position is a first occurrence relative to a start pointer, wherein said propagate and generate logic includes:
   a first stage for outputting a vector indicating one or more occurrences of said element in said entries of said memory queue;
   a second stage for outputting propagate and generate signals;
   a third stage for receiving said propagate and generate signals and outputting a vector indicating a possible first location of said element in said queue;
   a fourth stage for receiving said vectors output by said first and third stages, said fourth stage operable to output the first location of said element in said queue.

9. The method of claim 8 wherein said queue is a circular buffer.

10. The method of claim 8 wherein said element in said queue is a first valid memory access.

11. The method of claim 10 further comprising fetching an item from a Level two (L2) cache based on said first valid memory access.

12. A method for finding a particular occurrence of an element in a circular queue, said method comprising:
   inspecting contents of said circular queue for one or more occurrences of said element;
   determining a position of a start pointer relative to said contents of said circular queue;
   using propagate and generate logic, wherein said propagate and generate logic includes:
   a first stage for outputting a vector indicating one or more occurrences of said element in said entries of said memory queue;
   a second stage for outputting propagate and generate signals;
   a third stage for receiving said propagate and generate signals and outputting a vector indicating a possible first location of said element in said queue;
   a fourth stage for receiving said vectors output by said first and third stages, said fourth stage operable to output the first location of said element in said queue;
   determining which of said one or more occurrences of said element is a first occurrence after said start pointer; and
   generating an output vector indicating a position of said first occurrence.

13. The method of claim 12 wherein said element in said circular queue is an instruction to be executed in a pipeline.

14. The method of claim 13 further comprising issuing said instruction to said pipeline.

15. The method on claim 12 wherein said propagate and generate logic is implemented in one of:
   one or more circuit logic gates; and
   computer instructional code.

16. The method of claim 12 wherein said circular queue is a 32-element circular buffer.

17. A system for determining a location of a first valid entry in a memory queue, the system comprising:
   means for inspecting a plurality of subsets of values in the memory queue and outputting a first vector for each subset indicating which, if any, of the values in each subset is a first occurrence of a desired value in that subset;
   means for receiving groups of said subsets, indicating by a second vector whether one of said groups includes two said subsets split by a start pointer, indicating by said second vector whether said subsets in each said group indicates an occurrence of said desired value, and indicating by said second vector a position of said start pointer;
   means for processing at least a portion of said second vector and indicating by a third vector which of said groups includes an occurrence of said desired value that is first in order in said memory queue after said start pointer and which of said groups follows said group that includes said occurrence of said desired value that is first in order in said memory queue after said start pointer; and
   means for processing at least portions of said first, second, and third vectors and generating an output vector indicating a position in said queue that contains said occurrence of said desired value that is first in said queue after said start pointer.

* * * * *

UNITED STATES PATENT AND TRADEMARK OFFICE
CERTIFICATE OF CORRECTION

| | |
|---|---|
| PATENT NO. | : 7,415,580 B2 |
| APPLICATION NO. | : 11/194372 |
| DATED | : August 19, 2008 |
| INVENTOR(S) | : David E. Bradley et al. |

It is certified that error appears in the above-identified patent and that said Letters Patent is hereby corrected as shown below:

In column 4, line 39, after "occurring" insert -- in --.

Signed and Sealed this

Eighteenth Day of November, 2008

JON W. DUDAS
*Director of the United States Patent and Trademark Office*